United States Patent [19]
Allen

[11] Patent Number: 5,398,490
[45] Date of Patent: Mar. 21, 1995

[54] ENDLESS CUTTING HEAD FOR LAWN MOWER

[76] Inventor: Frank R. Allen, 405 Harbison Blvd., Timberlake #827, Columbia, S.C. 29212

[21] Appl. No.: 254,954

[22] Filed: Jun. 7, 1994

[51] Int. Cl.$^6$ ............................................. A01D 34/83
[52] U.S. Cl. ......................................... 56/244; 56/291
[58] Field of Search ................. 56/12.5, 244, 245, 290, 56/291, 292, 154

[56] References Cited

U.S. PATENT DOCUMENTS

| | | | |
|---|---|---|---|
| 591,567 | 10/1897 | Patten | 56/292 |
| 2,728,181 | 12/1955 | Carpenter | 56/12.7 |
| 2,744,376 | 5/1956 | Miner | 56/290 X |
| 3,006,126 | 10/1961 | Viverette | 56/13.3 |
| 3,217,473 | 11/1965 | Lawrie | 56/154 X |
| 3,242,659 | 3/1966 | Dunlap | 56/17.4 |
| 3,964,243 | 6/1976 | Knipe | 56/17.5 |
| 4,532,708 | 8/1985 | Mensing | 30/347 |
| 4,916,887 | 4/1990 | Mullet et al. | 56/13.8 |
| 5,012,635 | 5/1991 | Walters et al. | 56/13.6 |
| 5,019,113 | 5/1991 | Burnell | 56/295 |
| 5,261,217 | 11/1993 | Allen | 56/244 |

FOREIGN PATENT DOCUMENTS

| | | | |
|---|---|---|---|
| 122297 | 4/1931 | Germany | 56/291 |
| 1915534 | 11/1980 | Germany | 56/244 |

Primary Examiner—David J. Bagnell
Attorney, Agent, or Firm—Michael A. Mann

[57] ABSTRACT

A cutter head for a lawn mower which has a plurality of fingers arranged in two sets, one above the other, that extend forward in the direction of travel to channel grass between them. Between the fingers is a conveyor belt carrying a set of short blades moving transverse to the direction of motion of the mower for shearing the grass that is channeled by the fingers. The blades are preferably arranged at different levels to mulch the grass. Each blade is preferably split and bent to form multiple cutting edges at different levels. In one embodiment, the lower set of fingers extends farther forward than the upper set to better lift the grass for cutting. In an alternate embodiment, the upper set of fingers extends forward of the lower set and curves downwardly to lift objects out of the path of the mower. The continuous conveyor belt is conveyed around three sheaves that carry the plurality of blades and a sweeper to sweep grass from the cutter head.

21 Claims, 3 Drawing Sheets

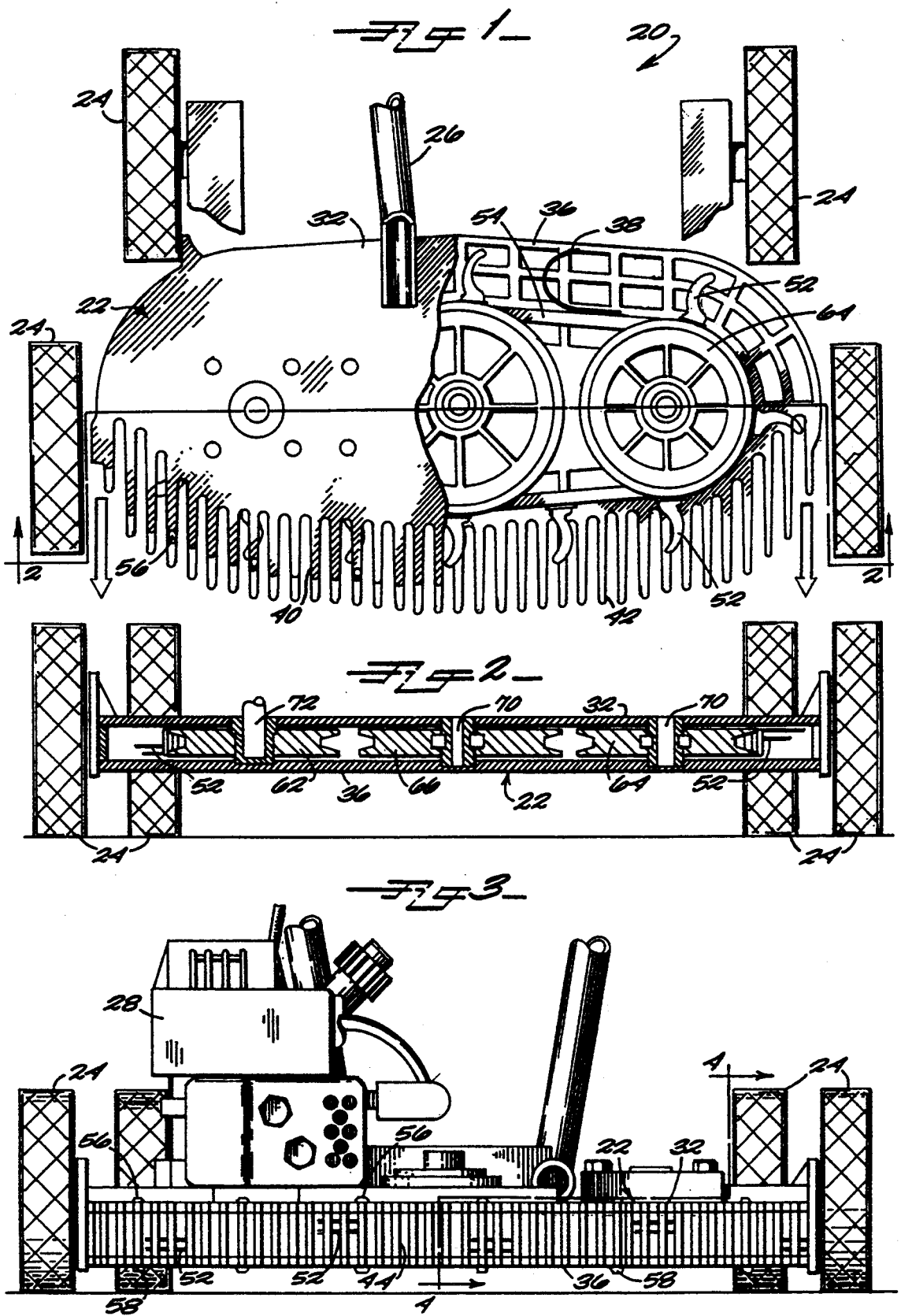

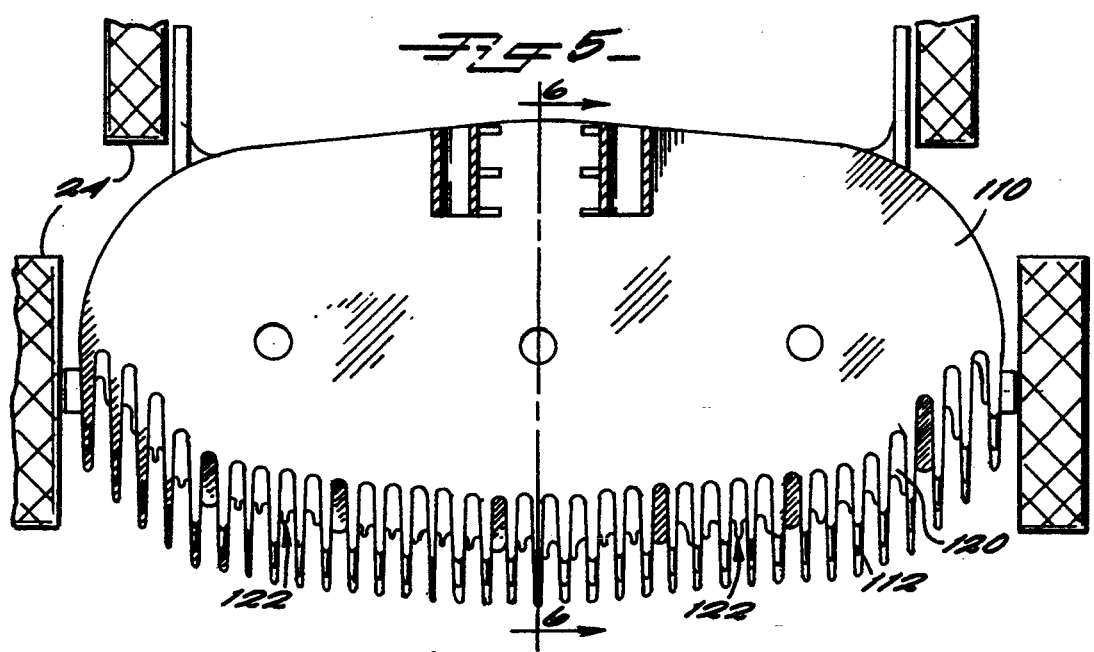
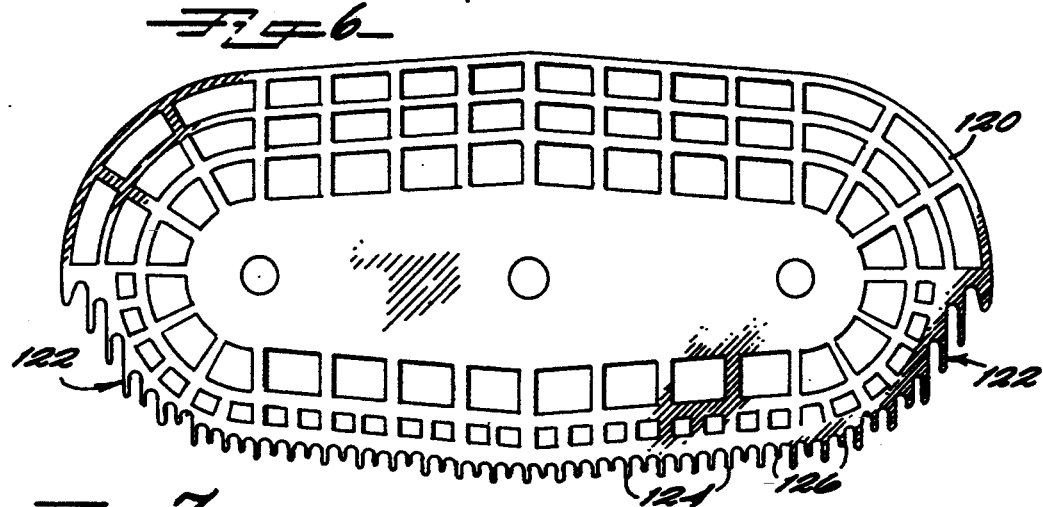
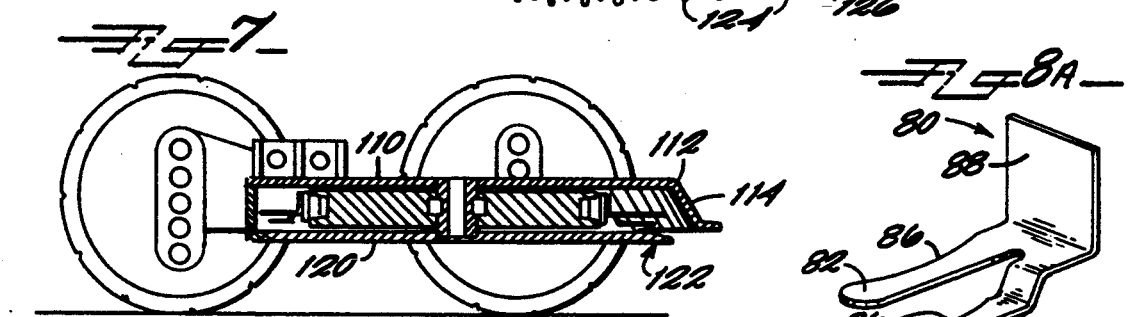
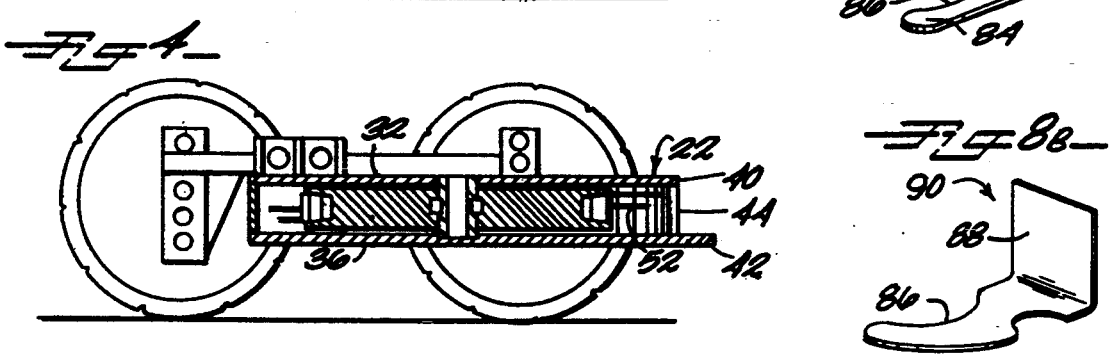
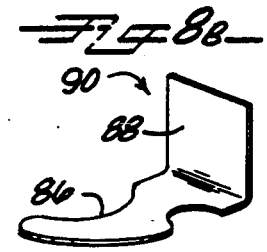

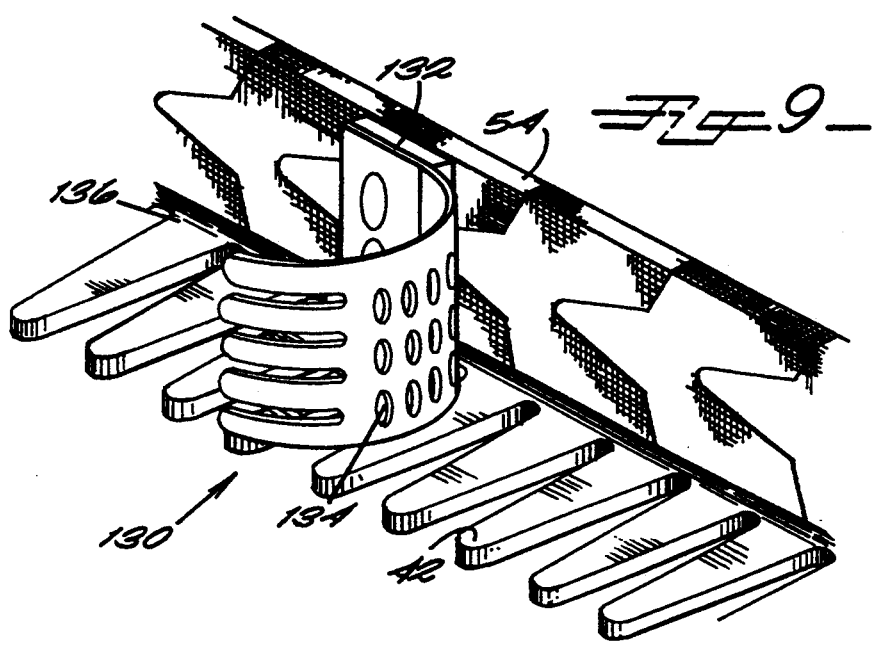

ENDLESS CUTTING HEAD FOR LAWN MOWER

BACKGROUND OF THE INVENTION

1. Field of the Invention

The present invention relates to lawn mowing and mulching devices. More particularly, the present invention relates to a cutter head for use with a non-rotary, power lawn mower.

2. Discussion of Background

Lawn mowers are well known devices used for cutting grass to maintain the appearance of an area. There are many types of lawn mowers, including rotary mowers and reel mowers. Lawn mowers featuring additional functions, such as mulching, collecting grass clippings, and the like, are also well known. Additionally, many different cutting blades or cutter heads are known for use with lawn mowing devices.

The most widely known lawn mower in use is the power rotary lawn mower having a single rotating blade with cutting edges at opposing distal ends of the blade. The cutting blade rotates at a high speed within a circular housing to both cut the grass and create an upward draft to urge the blades of grass to stand upward for better cutting. The power mower housing functions to prevent injury to the user and to control the direction of discharge of grass clippings and other debris encountered during mower operation.

Normally, the cutting blade is centrally mounted on a shaft extending vertically through the housing from a gasoline or electric powered motor secured on the top of the housing. The motor causes the cutting blade to be rotated at high speeds, clipping the grass immediately under the housing.

Different rotary cutting blade configurations for power lawn mowers are used for a variety of reasons. For example, Burnell, in U.S. Pat. No. 5,019,113, discloses a rotary lawn mower blade assembly having easily detachable replacement blades. Mensing, in U.S. Pat. No. 4,532,708, discloses a blade assembly with a plurality of cutting segments arranged end to end for improved cutting. Also, in U.S. Pat. No. 3,964,243, Knipe features a rotary cutting blade with detachable tines used to blow grass clippings from the mower path.

Mullet, et al., in U.S. Pat. No. 4,916,887, discloses a rotary mulching mower. The mower has a plurality of cutting blades rotatably positioned in a housing for producing mulch. Each cutting blade rotates through a different plane within the housing for cutting the grass clippings into a fine mulch.

The most significant problem with conventional rotary mowers is the inherent danger presented by a high-speed whirling blade. The blade is a direct threat if the user comes into contact with it, and an indirect threat if it propels an object from the housing. Furthermore, because the blade must be exposed to the grass, even the housing that covers it to protect the user is of no help if the mower overturns. Numerous safety features attempt to minimize the threat of direct and indirect injury from the blade.

Several problems exist with current rotary lawn mowers having rotary blades. Rocks, limbs, roots and other foreign debris entering the housing can damage the rotary blades or be suddenly propelled from the housing. Also, the blades become extremely dull and tend to rip and tear the grass rather than cut it cleanly. In sandy soil, the blades erode very rapidly. Thus, the blades have to be frequently replaced or sharpened.

In tall grass, a conventional mower bends the grass as the mower housing passes over it. If the grass is very long, the housing will hold it to the ground so that it is not cut.

Another problem with current rotary lawn mowers is the relatively slow speed at which the mower can travel across a lawn or other grassy areas to be cut. Even when rotating at high speeds, a single blade with 2 cutting edges requires the lawn mower to travel at very low speeds. Thus, it takes a substantial amount of time to mow large areas of grass.

Grass tends to spread either horizontally or vertically. Current lawn mowers only cut vertically growing grasses doing nothing to help cut the horizontally growing stems. By not cutting these stems, thatching problems occur in lawns of certain type grass.

In U.S. Pat. No. 5,261,217, I disclose an innovative design for a non-rotary power lawn mower that eliminates many of these problems. My mower uses multiple blades to aid in the mulching of the cut grass, and also partially encloses these blades to increase the safety of the apparatus. The blades are enclosed in fingers extending parallel to the direction of the motion of the mower. These fingers do not bend the grass down as it enters the cutting area and thus allows a full cut of the grass blade to be made. This design has a number of parts, however, that must be aligned in manufacturing.

There remains a need for a lawn mower that addresses the problems of rotary lawn mowers and is simple to manufacture and assemble.

SUMMARY OF THE INVENTION

According to its major aspects and broadly stated, the present invention is a non-rotary, power lawn mower where blades are carried by a belt across fingers through which grass is channeled for cutting. In particular, the present invention includes a cutter head with a multiple-blade assembly. The cutter head includes a plurality of interconnected fingers carried by top and bottom plates that cooperate with a continuously moving plurality of blades. The blades are moved just over and across the fingers of the bottom plate. The fingers are oriented in parallel to the lawn mower's direction of motion in order to channel the grass into the spaces between them and set the grass up for cutting. The blades are carried by a continuous conveyor belt around spaced-apart sheaves that move the blades in a roughly oval path with a long dimension perpendicular to the direction of motion. These blades are preferably constructed in two levels, an upper level and a lower level, with the upper level extending farther forward than the lower level so the upper level blades make the first cut in the particular blade of grass before lower level blades make their cut. The grass clippings are swept from the cutter head by a sweeper, where they fall below the cutter head as mulch.

An important feature of the present invention is the cooperation of the plurality of blades with the fingers to shear grass channeled into the spaces between the fingers. The fingers are spaced apart to catch grass, even tall grass, entering the cutter head between them during movement of the mower and to set up the entering grass for the moving blades to shear. The advantage of this feature is that grass is cut more cleanly and evenly, rather than being torn or pulled by conventional rotary mowers, because the grass is being stood up in cutting position mechanically rather than by the vacuum of a single, whirling blade. Shearing each blade of grass at different levels for mulching reduces or eliminates the need for bagging the grass. Also, the absence of the intake of air around the periphery of the mower reduces the amount of dirt and sand stirred up by the mower. The absence of a need for power to lift the grass by negative air pressure makes the present mower quieter and reduces its power requirements.

Another feature of the present invention is the use of a plurality of blades moved by a belt and sheave system. Because a plurality of blades is used, the mower can move much faster across an area of grass and still cut the grass effectively. The preferred rate of transverse cutting speed allows the mower to cut grass in excess of 5 miles per hour, faster than current rotary mowers. The increased number of blades allows a clean, even cut with a blade tip speed much lower than that of a single-blade power mower.

Still another feature is the relationship of the upper level of blades to the lower one. The upper one extends farther forward so it shears the grass before the lower one for mulching.

The relationship of the two sets of fingers is also an important feature of the present invention. In one embodiment, the lower fingers extend farther forward than the upper fingers so that they intercept and channel the grass first, beginning to stand it up by the time the second, upper level of fingers continues the process of standing up the grass for cutting. In an alternative embodiment, appropriate for shorter grasses and where objects may be in the path of the mower, the upper fingers extend farther forward than the lower set of fingers and curve downwardly to lift objects out of the way of the mower.

Yet another feature is the use of a sweeper carried by the continuous belt to sweep clippings from the housing to keep the mower clean.

Still another feature is the interconnection of the fingers extending from the frame. Vertically connecting the fingers forward of the blades, together with relatively narrow spacing between the fingers, keeps objects, such as rocks, from entering the cutter head yet allows grass to enter the cutter head to be sheared.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a cut away view of a power lawn mower featuring a cutter head with the engine removed according to a preferred embodiment of the present invention.

FIG. 2 is a front cross-sectional view of the cutter head taken along lines 2—2 of FIG. 1.

FIG. 3 is a front view of a power lawn mower according to a preferred embodiment of the present invention.

FIG. 4 is a side cross-sectional view of the cutter head taken along lines 4—4 of FIG. 3.

FIG. 5 is a top view of a top plate according to an alternative embodiment of the present invention.

FIG. 6 is a top view of a bottom plate according to an alternative embodiment of the present invention.

FIG. 7 is a side cross-sectional view of the cutter head according to an alternative embodiment of the present invention.

FIG. 8a is a view of a blade configuration in the preferred embodiment of the present invention.

FIG. 8b is a view of a blade configuration in a different embodiment of the present invention.

FIG. 9 is a perspective view of the sweeper in the preferred embodiment of the present invention.

DETAILED DESCRIPTION OF A PREFERRED EMBODIMENT

In the following description similar components are referred to by the same reference numeral in order to simplify the understanding of the sequential aspect of the drawings.

Referring now to FIGS. 1, 2, 3, and 4, the non-rotary power lawn mower 20 in its preferred embodiment comprises a cutter head 22 preferably attached to wheels 24 and handle 26. Also, cutter head 22 is powered by an electric motor or gasoline engine 28 preferably having a power output of approximately two horsepower for a twenty-two inch wide cutting head. Mower 20 moves in the direction indicated in FIG. 1.

Cutter head 22 is assembled from two layers, including top plate 32, and bottom wear plate 36. Top plate 32 is preferably constructed of a die cast aluminum and bottom wear plate 36 is preferably injection molded using an engineered plastic such as nylon or Delrin 500 series. Alternatively, bottom wear plate 36 can be constructed of two plates, a bottom plate and wear plate. In this configuration, the bottom plate could be constructed from a die cast aluminum and wear plate could be injection molded of engineered plastic. Bottom wear plate 36 contains holes 38 in its structure to allow cut grass to easily fall through to the ground.

On the front of top plate 32 are a plurality of top fingers 40. Top fingers 40 have a major dimension parallel to the direction of motion of the mower. On the front of bottom wear plate 36 are a plurality of bottom fingers 42. Bottom fingers 42 also have a major dimension parallel to the direction of motion of the mower. In the preferred embodiment, bottom fingers 42 are longer so that they extend farther forward than top fingers 40. As the mower moves forward, grass enters the spaces between bottom fingers 42 first, which stand up the grass blades and then top fingers 40, thus standing up the grass fully to be cut.

Extending downwardly from the tip of top fingers 40 of top plate 32 are rods 44, preferably integral with top plate 32, that intersect bottom fingers 42 of bottom wear plate 36. Rods 44 in combination with the two sets of fingers 40, 42, prevent rocks, twigs and other debris from entering the interior of cutter head 22, yet allows grass to be channeled into cutter head 22 by top and bottom fingers 40, 42. By preventing foreign objects from entering the interior of the mower, the user and the interior of the mower 20 are protected.

A plurality of blades 52, assembled together around belt 54 are located between top plate 32 and bottom wear plate 36. Blades 52 are preferably assembled together on a continuous link or V-belt 54, or other conveyors such as a chain or a notched belt, so that, during operation of cutter head 22, blades 52 move continuously across fingers 40, 42 in a direction transverse to the direction of mower. Belt 54 passes around a driving sheave 62, a driven sheave, 64 and, in a preferred embodiment, an idler sheave 66.

Driven sheave 64 and idler sheave 66 are each mounted on a shaft 70. Shaft 70 rotates freely in top plate 32 and bottom wear plate 36. Driving sheave 62 is mounted on and turned by a drive shaft 72, extending from engine 28. In the preferred embodiment of the cutter head 22, engine 28 is mounted on one side of mower 20, and then connected to drive shaft 72 at that point. It is possible to mount engine 28 in a different location on the cutter head 22 as long as engine 28 rotates driving sheave 62 through drive shaft 72.

Top plate 32 and bottom wear plate 36 are aligned and secured by a plurality of clamping bolts 56 and nuts 58 running from top plate 32 through rods 44 of top fingers 40 as well as the remainder of the periphery of top plate 32 to bottom wear plate 36. Nuts 58 hold clamping bolts 56 tightly to secure top plate 32 in spaced relation to bottom wear plate 36.

Blades 52 are preferably displaced vertically and horizontally. In the preferred embodiment, blade 80 (see especially FIG. 8a) is constructed from one piece of metal split and bent to form an upper cutting edge 82 and a lower cutting edge 84. A bracket 88 holds them to belt 54. Preferably, lower cutting edge 84 is bent downwardly rather than upper cutting edge 82, so that there is a vertical stagger of edges 82, 84. Moreover, by this configuration, upper cutting edge 82 extends farther forward than lower cutting edge 84. The object of this blade arrangement is to have upper cutting edge 82 cut grass before the lower cutting edge 84 cuts the grass. Thus, the grass blades are cut at multiple levels, mulching the grass and eliminating the need for a bagging device.

Both upper cutting edge 82 and lower cutting edge 84 have a concave leading edge 86 in the direction of motion of blades 52. By having concave leading edge 86 on both cutting edges 82, 84 the grass is shear cut instead of it being chopped or torn.

In an alternative embodiment of the blades 52 a single blade 90 may be used (see especially FIG. 8b). It is also possible to mount this blade 90 at separate heights along belt 54 by bracket 88. By mounting at different heights, the same object of cutting grass blades multiple times is accomplished. Single blade 90 also has a concave cutting surface 86 to shear or slice the grass instead of it being chopped or torn. Additionally blade 80 may be mounted at different heights.

Referring now to FIG. 9, sweeper 130 is attached by bracket 132 to belt 54 in place of one of blades 52. Sweeper 130 sweeps grass cuttings from the blade area inside cutting head 22 along bottom wear plate 36 and bottom fingers 42. As sweeper 130 circulates throughout cutter head 22, it brushes the cut grass through holes 38 in bottom wear plate 36. Sweeper 130 is constructed in a cup shape with plurality of holes 134 and a plurality of fingers 136. Holes 134 are located about the mid-section of sweeper 130 and are present to decrease wind resistance when belt 54 is in motion. Fingers 136 are located at the end of sweeper 130 and are used to better brush the cut grass from the bottom finger 42 and bottom wear plate 36.

Now referring to FIGS. 5, 6, and 7, an alternative embodiment of the present invention is shown. In this embodiment the top plate 110, bottom wear plate 120, top fingers 112, and bottom fingers 122 are substantially different from the preferred embodiment.

On top plate 110, top fingers 112 extend in the same direction and configuration as the preferred embodiment. However, top fingers are longer and extend farther forward than bottom fingers 122. As top fingers 112 extend forward, they curve downwardly (see especially FIG. 6) along curved portion 114 above, but forward of bottom fingers 122. After curved portion 114, top fingers 112 curve again forward of bottom fingers 122.

Bottom wear plate 120 and bottom finger 122 have a unique finger design. Bottom fingers 122 alternate having an extending finger 124 and a shorter extending finger 126 and are uniformly spaced apart (see especially FIG. 7).

The function of the top fingers 112 in this embodiment is to lift objects (such as golf tees, twigs, or rocks) from the path of the mower thereby protecting the blades 52 and other interior components of the mower 20 from damage.

Once belt 54, carrying blades 52, is rotating around sheaves 62, 64, 66 lawn mower 20 moves across an area of grass to be cut. As lawn mower 20 moves in a direction of motion over an area of grass, fingers 40, 42, extending parallel to the direction of motion, the blades of grass enter mower 20 in the spaces between fingers 40, 42 for cutting.

As grass enters the spacing between fingers 40, 42, blades 52 moving across fingers 40, 42 shear the entering grass at each vertical level of the blades. The grass is cut cleanly and evenly at each level, unlike rotary mowers that tend to pull and tear the grass. The freshly cut grass clippings fall below cutter head 22 through the openings provided in the front and rear areas of bottom wear plate 36.

The separation between the axes of rotation of driving sheave 62 and driven sprocket 64 can be made as large as desired for mowers capable of mowing a wider path. For a wider mower 20, belt 54 would be longer and more blades 52 would be used but blades 52 would be the same size as for a smaller mower 20 as well as blade tip speed, engine RPM, and external drive speed ratio. A conventional power rotary mower requires more horsepower per inch of width than a mower according to the present invention.

Because of the design, "scalping" a lawn is avoided, rather, floating or contour cutting and cutting close to boundaries is made possible by the oval cutting path of the blades for trimming. Furthermore, in addition to forming mulch of the cut grass, a mower according to the present invention leaves topsoil in place because it relies on the fingers to set up and capture the grass rather than a vacuum from a high-speed blade that vacuums up soil particles and sand.

The present mower is safer than conventional power mowers because it is much more difficult to have serious injuries to arms or legs. Objects cannot be propelled at high speed from the mower. It is much more difficult for a user to come into contact with the blades. Furthermore, the blades will stay sharper longer because large objects cannot enter between the fingers of the mower.

It will be apparent to those skilled in the art that many changes and substitutions can be made to the preferred embodiment herein described without departing from the spirit and scope of the present invention as defined by the appended claims.

What is claimed is:

1. Apparatus for cutting grass, said apparatus for moving in a direction across said grass, said apparatus comprising:
   a frame;

a first plurality of fingers carried by said frame, each finger of said first plurality of fingers spaced apart from adjacent fingers of said first plurality of fingers and having a major dimension parallel to said direction so that, as said apparatus crosses said grass, said grass enters said apparatus, channeled by said fingers;

a second plurality of fingers above said first plurality of fingers and carried by said frame, each finger of said second plurality of fingers spaced apart from adjacent fingers of said second plurality of fingers and having a major dimension parallel to said direction so that, as said apparatus crosses said grass, said grass enters said apparatus, channeled by said fingers;

a plurality of blades between said first and said second pluralities of fingers, said plurality of blades having an upper cutting edge and at least one lower cutting edge; and means carried by said frame for conveying said blades past said first plurality of fingers so that said grass entering said frame between said first and said second pluralities of fingers is cut by said plurality of blades, said plurality of blades attached to said conveying means.

2. The apparatus as recited in claim 1, wherein said conveying means further comprises:
an endless conveyor;
a driving sheave;
a driven sheave spaced apart from said driving sheave, said endless conveyor running between said driven sheave and said driving sheave;
a drive shaft carried by said frame for rotating said driving sheave; and
means in operative connection with said drive shaft for rotating said drive shaft.

3. The apparatus as recited in claim 2, wherein said endless conveyor is selected from the group consisting of a linked chain, a linked belt, and a continuous V-belt.

4. The apparatus as recited in claim 1, wherein said upper cutting edge of said plurality of blades extends farther forward than said lower cutting edge so that said upper cutting edge of said plurality of blades cuts grass entering said plurality of fingers before said lower cutting edge cuts said grass.

5. The apparatus as recited in claim 1, wherein each said fingers of said first plurality of fingers has a wear surface over which said plurality of blades passes.

6. The apparatus as recited in claim 1, wherein said frame further comprises a bottom plate, said first plurality of fingers carried by said bottom plate.

7. The apparatus as recited in claim 1, further comprising means carried by said conveying means for sweeping grass from said frame.

8. The apparatus as recited in claim 1, wherein said second plurality of fingers is longer than said first plurality of fingers and curves downward, forward of said first plurality of fingers to lift objects from the path of said apparatus when said apparatus is moving in said direction.

9. Apparatus for cutting grass, when moving in a direction across said grass, said apparatus comprising:
a frame;
a first set of fingers carried by said frame, each finger of said first set of fingers spaced apart from each other finger and having a major dimension parallel to said direction so that, as said frame moves across said grass, said grass enters said frame, channeled by said spaced-apart fingers of said first set of fingers;

a second set of fingers above said first set of fingers, each finger of said second set of fingers spaced apart from each other finger and having a major dimension parallel to said direction so that, as said frame moves across said grass, said grass enters said frame, channeled by said spaced-apart fingers of said second set of fingers;

at least one set of blades;
means carried by said frame for conveying said at least one set of blades between said first and said second set of fingers so that said grass entering said frame between said spaced-apart fingers is cut by said at least one set of blades, said at least one set of blades attached to said conveying means;
means carried by said frame for moving said conveying means, and
means carried by said conveying means for sweeping cut grass from said frame.

10. The apparatus as recited in claim 9, wherein said conveying means further comprises:
an endless conveyor;
a driving sheave;
a driven sheave spaced apart from said driving sheave, said endless conveyor running between said driving sheave and said driven sheave;
a drive shaft carried by said frame for rotating said driving sheave; and
means in operative connection with said drive shaft for rotating said drive shaft.

11. The apparatus as recited in claim 10, wherein said endless conveyor is selected from the group consisting of a linked chain, a linked belt and a continuous V-belt.

12. The apparatus as recited in claim 9, wherein each of said at least one set of blades has an upper cutting edge and a lower cutting edge.

13. The apparatus as recited in claim 12, wherein said upper cutting edge is longer than said lower cutting edge so that said upper cutting edge shears grass channeled by said plurality of fingers before said lower cutting edge shears said grass.

14. The apparatus as recited in claim 9, wherein each of said fingers of said first set of fingers has a wear surface protecting said each finger from said plurality of blades.

15. The apparatus as recited in claim 9, wherein said assembly further comprises a bottom plate, said first set of fingers carried by said bottom plate.

16. The apparatus as recited in claim 9, wherein said second set of fingers is longer than said first set of fingers and curves downwardly, forward of said first set of fingers, to lift objects from the paths of said apparatus when said apparatus is moving in said direction.

17. Apparatus for cutting grass, said apparatus comprising;
a frame;
an assembly carried by said frame having two sets of fingers, each finger of said two sets of fingers spaced apart from each other finger and having a major dimension parallel to said direction of said apparatus so that, as said assembly is moved across said grass, said grass enters said assembly, channeled by said two sets of fingers;
said two sets of fingers including a first set of fingers and a second set of fingers above and spaced apart from said first set of fingers, said second set of fingers extending farther forward than said first set of fingers, said second set curving downwardly, forward of said first set to lift objects out of the path of said apparatus;

at least one set of blades mounted on said frame;

an endless conveyor carrying said at least one set of blades between said first set of fingers and said second set of fingers so that said grass channeled by said two sets of fingers is cut by said at least one set of blades;

a driving sheave carried by said frame;

a driven sheave carried by said frame and spaced apart from said driving sheave, said endless conveyor traveling around said driving and said driven sheave;

means carried by said frame for rotating said driving sheave; and a plurality of ground-engaging wheels attached to said frame.

18. The apparatus as recited in claim 17, wherein each blade of said set of blades is curved to shear grass channeled by said blades.

19. The apparatus as recited in claim 17, further comprising means carried by said endless conveyor for sweeping grass from said frame.

20. The apparatus as recited in claim 17, wherein each blade of said set of blades has an upper cutting edge and a lower cutting edge, said upper cutting edge extending farther forward than said lower cutting edge so that said upper cutting edge shears said grass channeled by said two sets of fingers before said lower cutting edge shears said grass.

21. The apparatus as recited in claim 17, wherein said first set of fingers extends farther forward than said second set of fingers.

* * * * *